United States Patent
Rawlings et al.

(10) Patent No.: US 8,987,584 B2
(45) Date of Patent: Mar. 24, 2015

(54) PRE-ASSEMBLED SOLAR PANEL MOUNTING SYSTEM AND RAPID SOLAR PANEL MOUNTING SYSTEM

(71) Applicants: Advanced Solar Products, Inc., Flemington, NJ (US); Lyle K. Rawlings, Flemington, NJ (US)

(72) Inventors: Lyle K. Rawlings, Hopewell, NJ (US); Christopher Rawlings, Flemington, NJ (US)

(73) Assignees: Lyle K. Rawlings, Flemington, NJ (US); Advanced Solar Products, Flemington, NJ (US)

( * ) Notice: Subject to any disclaimer, the term of this patent is extended or adjusted under 35 U.S.C. 154(b) by 17 days.

(21) Appl. No.: 14/021,454

(22) Filed: Sep. 9, 2013

(65) Prior Publication Data

US 2014/0069485 A1    Mar. 13, 2014

Related U.S. Application Data

(60) Provisional application No. 61/698,167, filed on Sep. 7, 2012.

(51) Int. Cl.
*H02S 30/10*    (2014.01)
*H01L 31/042*   (2014.01)
(Continued)

(52) U.S. Cl.
CPC .............. *H01L 31/0422* (2013.01); *F24J 2/52* (2013.01); *H01L 31/0484* (2013.01); *Y02E 10/50* (2013.01); *Y02B 10/20* (2013.01); *Y02B 10/12* (2013.01)
USPC ............................ 136/251; 136/244; 136/245

(58) Field of Classification Search
USPC ......................................... 136/244, 245, 251
See application file for complete search history.

(56) References Cited

U.S. PATENT DOCUMENTS 3,899,857 A    8/1975   Mochizuki
4,189,881 A    2/1980   Hawley
(Continued)

FOREIGN PATENT DOCUMENTS

DE    3423227 A1    1/1986
DE    29815134 U1   2/1999
(Continued)

OTHER PUBLICATIONS

Office Action issued Aug. 19, 2009 in U.S. Appl. No. 12/026,994.
(Continued)

*Primary Examiner* — Jayne Mershon
(74) *Attorney, Agent, or Firm* — Panitch Schwarze Belisar & Nadel LLP

(57) ABSTRACT

A solar panel mounting system includes first and second mounting supports, at least one having a lower mounting ledge, and at least the other having an upper mounting ledge. At least two brackets each have a first platform coupled to the lower mounting ledge and a second platform spaced apart therefrom. Each bracket includes a first hinge portion with a curved channel and a first catch. A first frame, at a first end, has a panel gripping portion for gripping an edge of a solar panel oriented generally parallel to the lower mounting ledge, and at an opposing second end has a second hinge portion with a flange and a curved hook extending therefrom. The first hinge portion is configured to rotatably receive the second hinge portion. The hook is received in the channel and retained by the first catch and the flange is supported on the second platform.

10 Claims, 9 Drawing Sheets

(51) Int. Cl.
*F24J 2/52* (2006.01)
*H01L 31/048* (2014.01)

(56) References Cited

U.S. PATENT DOCUMENTS

| | | | |
|---|---|---|---|
| 4,966,631 | A | 10/1990 | Matlin et al. |
| 5,164,020 | A | 11/1992 | Wagner et al. |
| 5,505,788 | A | 4/1996 | Dinwoodie |
| 5,571,338 | A | 11/1996 | Kadonome et al. |
| 5,741,370 | A | 4/1998 | Hanoka |
| 5,746,839 | A | 5/1998 | Dinwoodie |
| 5,762,720 | A | 6/1998 | Hanoka et al. |
| 5,986,203 | A | 11/1999 | Hanoka et al. |
| 6,105,316 | A | 8/2000 | Bottger et al. |
| 6,111,189 | A | 8/2000 | Garvison et al. |
| 6,414,237 | B1 | 7/2002 | Boer |
| 6,672,018 | B2 | 1/2004 | Shingleton |
| 6,809,251 | B2 | 10/2004 | Dinwoodie |
| 6,968,654 | B2 | 11/2005 | Moulder et al. |
| RE38,988 | E | 2/2006 | Dinwoodie |
| 7,435,897 | B2 | 10/2008 | Russell |
| 7,921,843 | B1 | 4/2011 | Rawlings |
| 2006/0053706 | A1 | 3/2006 | Russell |
| 2008/0087275 | A1 | 4/2008 | Sade et al. |
| 2008/0172955 | A1 | 7/2008 | McClintock et al. |
| 2009/0242014 | A1 | 10/2009 | Leary |
| 2010/0132274 | A1 | 6/2010 | Reyal et al. |
| 2011/0154774 | A1 | 6/2011 | Rawlings |

FOREIGN PATENT DOCUMENTS

| | | | |
|---|---|---|---|
| DE | 102004012412 | A1 | 9/2005 |
| EP | 705795 | A1 | 4/1996 |
| EP | 858115 | A2 | 8/1998 |
| FR | 2496226 | A1 | 6/1982 |
| WO | 2008145913 | A2 | 12/2008 |

OTHER PUBLICATIONS

Office Action issued Apr. 5, 2010 in U.S. Appl. No. 12/026,994.
RapidRac Installation Manual 600.1; Jan. 2008.
Int'l Search Report issued Jun. 7, 2012 in Int'l Application No. PCT/US2012/027752; Written Opinion.
Int'l Preliminary Report on Patentability issued Sep. 19, 2013 in Int'l Application No. PCT/US2012/027752.
Int'l Search Report and Written Opinion issued Jan. 16, 2014 in Int'l Application No. PCT/US2013/058762.

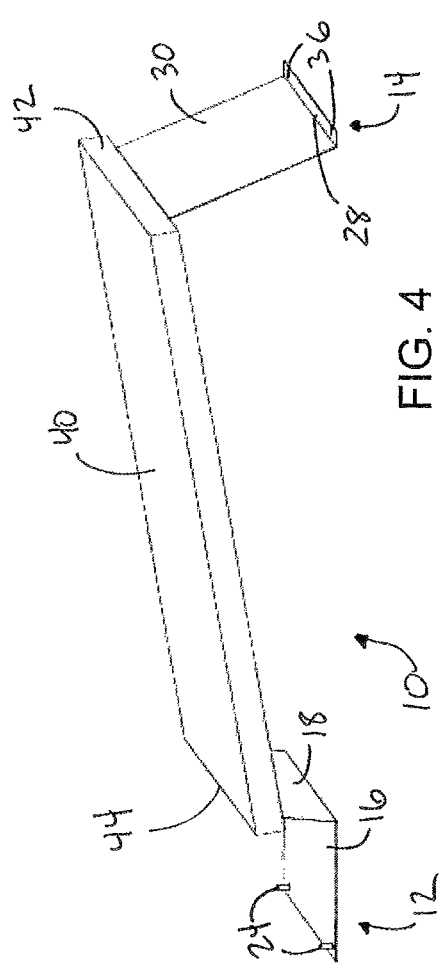
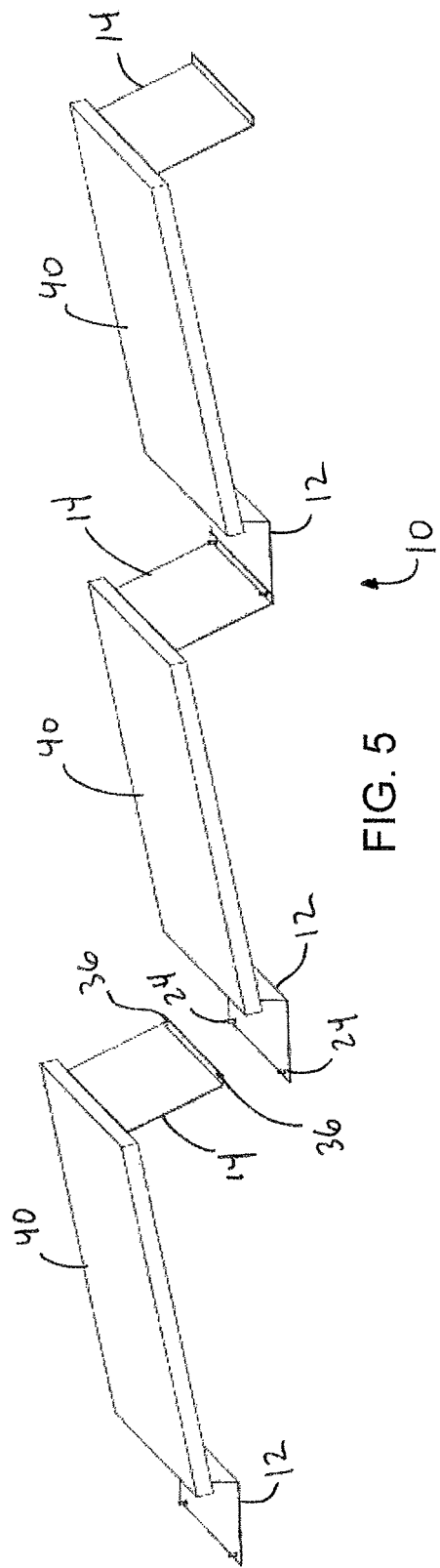

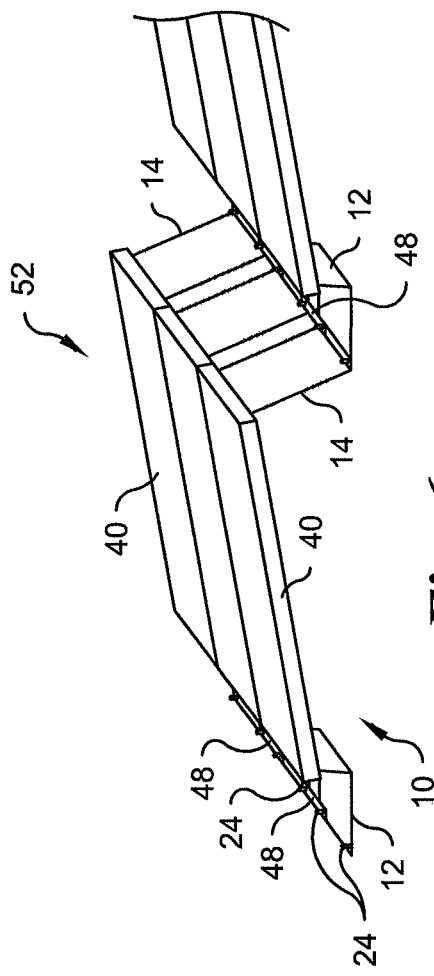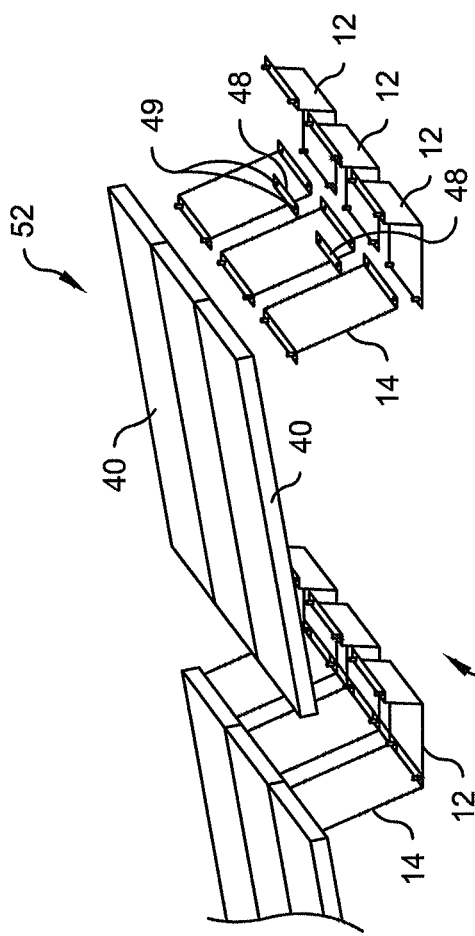

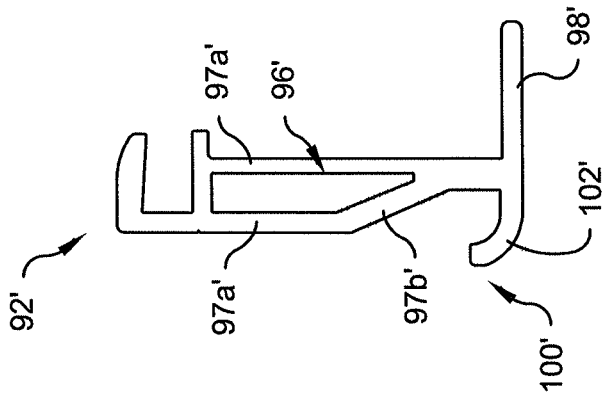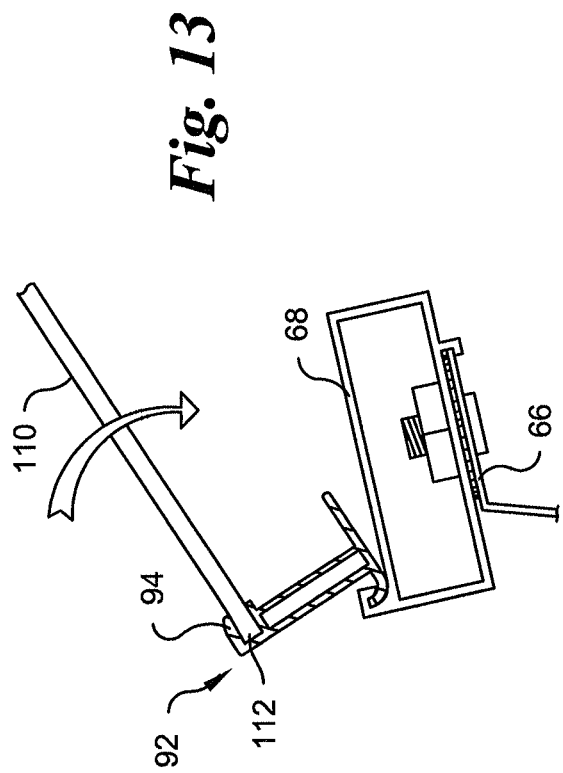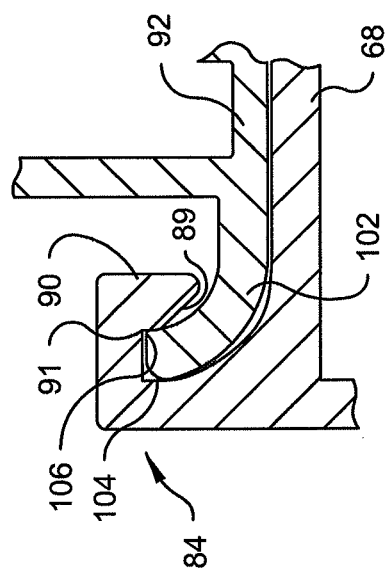

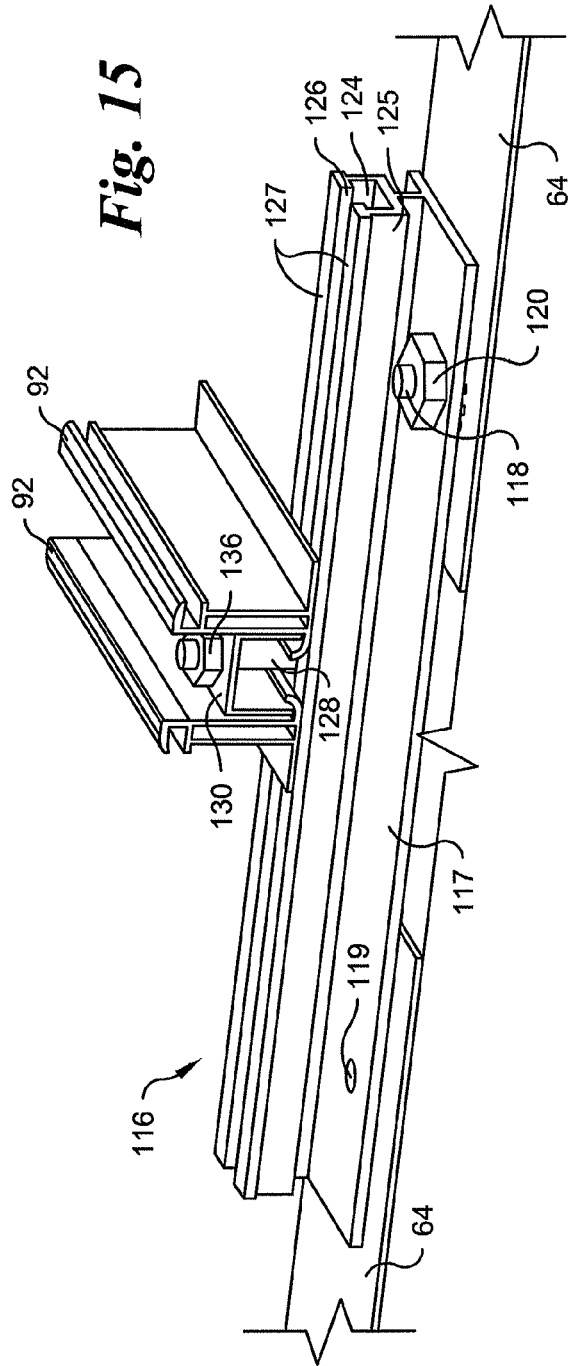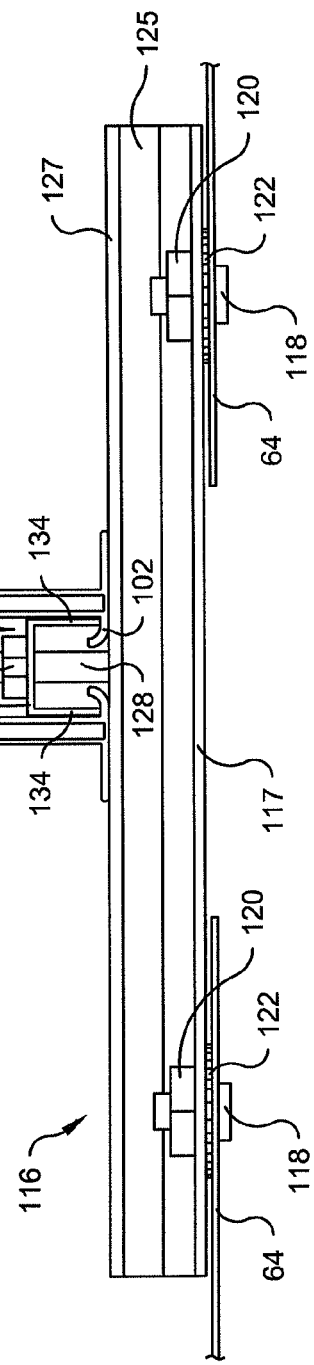

PRE-ASSEMBLED SOLAR PANEL MOUNTING SYSTEM AND RAPID SOLAR PANEL MOUNTING SYSTEM

CROSS-REFERENCE TO RELATED APPLICATIONS

This application claims priority to U.S. Provisional Patent Application No. 61/698,167, filed on Sep. 7, 2012, entitled "Pre-Assembled Solar Panel Mounting System and Rapid Solar Panel Mounting System," the entire contents of which are incorporated by reference herein.

BACKGROUND OF THE INVENTION

Embodiments of the present invention relate generally to mounting systems for solar panels, and more particularly, to mounting systems for solar panels that reduce or eliminate the need for hardware such as screws, bolts, or the like.

Given concerns about pollution, global warming and rising energy costs, many companies are trying to become more energy efficient and environmentally friendly. One way to achieve these goals is to use solar energy to produce electricity and/or heat water. Many commercial buildings have flat roofs. These large open roofs are ideal for placing an array of solar panels. However, many problems are encountered when solar panels are placed on a flat roof.

The flat roofs of commercial buildings include a large proportion of the solar panel arrays built in the U.S. and elsewhere. If the arrays should require many penetrations of the roof in order to fasten the panel mounting structures, such penetrations carry a risk of producing roof leaks. It is for this reason that building owners often require that solar panel arrays and other such auxiliary objects be free standing on the roof and not be physically attached to the roof nor penetrate the roof membrane. In many ground-mounted applications, it is likewise desirable or required to mount solar panel arrays without physical attachment or penetration of the ground.

If solar panel arrays cannot be secured in place on a roof or on the ground using fasteners, they must still be designed to be wind resistant. Solar panels are large flat structures. Gusts of wind acting under a solar panel can create lifting forces large enough to displace the solar panel. While solar panels can be weighted to increase wind resistance, roofs and some ground sites, such as landfills, have weight load limitations, and ballasts can be expensive. Solar panel arrays must be made light so as not to indent the mounting surface or combine with a large snowfall to surpass its weight capacity.

As a further complication, solar panels are rarely installed flush against a mounting surface. In most latitudes, solar panels are most efficient when mounted at an inclined angle. Accordingly, solar panels are traditionally placed upon some type of support framework that holds the solar panels at an incline. Mounting solar panels at inclined angles, however, exposes the underside of the panel to the wind and greatly reduces the wind resistance of the array.

The above-mentioned problems are conventionally addressed by using complex mounting frames that hold solar panels upon a flat surface. The mounting frames include a network of interconnected brackets that hold the solar panels at inclined angles. Weights are attached to the mounting frames to increase wind resistance. Lastly, wind deflectors are connected to the mounting frames to prevent winds from reaching the undersides of the solar panels. Such a prior art solar panel mounting system is exemplified by the RAPIDRAC system currently being marketed by Unirac of Albuquerque, N.Mex.

However, such systems are overly complex. In order to place even a small solar panel array on a roof or ground site requires the assembly of hundreds of different brackets, weights, and wind deflection panels. The complexity of such mounting systems adds significantly to the time, cost, and labor of installing a solar panel array. In addition, the mounting systems contact the roof only in the location of the support brackets. This concentrates the weight of the solar panel array to specific lines along the roof or ground surface.

It would be desirable to provide a mounting system for solar panels that can be installed using very little time and labor, and with relatively few parts. It is further desirable to integrate features into solar panel frames that would facilitate such a rapid and simplified mounting system while still maintaining compatibility with conventional mounting systems.

BRIEF SUMMARY OF THE INVENTION

Briefly stated, an embodiment of the present invention comprises a solar panel mounting system for use with a solar panel having a plurality of apertures formed in a mounting surface of the solar panel proximate first and second opposing ends of the solar panel. The mounting system includes a first support having a horizontal support section, an inclined side wall, and a mounting ledge. The horizontal support section and the mounting ledge of the first support are each coupled to opposing ends of the inclined side wall of the first support. A first plurality of spaced-apart studs are each disposed on and extend from the mounting ledge of the first support. Each of the first plurality of spaced-apart studs are configured to mate with corresponding ones of the plurality of apertures proximate the first end of the solar panel. A second support has a horizontal support section, an inclined side wall, and a mounting ledge. The horizontal support section and the mounting ledge of the second support are each coupled to opposing ends of the inclined side wall of the second support. A second plurality of spaced-apart studs are each disposed on and extend from the mounting ledge of the second support. Each of the second plurality of spaced-apart studs are configured to mate with corresponding ones of the plurality of apertures proximate the second end of the solar panel.

Another embodiment of the present invention comprises a solar panel mounting system for use with a solar panel. The mounting system includes first and second mounting supports. At least one of the first and second mounting supports has a lower mounting ledge, and at least the other of the first and second mounting supports has an upper mounting ledge. At least two brackets are coupled to the lower mounting ledge, each of the brackets including a first platform coupled to the lower mounting ledge and a second platform spaced apart from the first platform. Each bracket further includes a first hinge portion formed proximate the second platform. The first hinge portion includes a curved channel and a first catch. A first frame has at a first end thereof a panel gripping portion configured to grip the solar panel at an edge thereof oriented generally parallel with respect to the lower mounting ledge, and has at an opposing second end a second hinge portion comprising a flange and a curved hook extending from the flange. The first hinge portion of each of the at least two brackets is configured to rotatably receive the second hinge portion. The curved hook is received in the curved channel and retained by the first catch and the flange is supported on the second platform of the at least two brackets.

BRIEF DESCRIPTION OF THE DRAWINGS

The following detailed description of preferred embodiments of the invention, will be better understood when read in conjunction with the appended drawings. For the purpose of illustration, there are shown in the drawings embodiments which are presently preferred. It should be understood, however, that the invention is not limited to the precise arrangements and instrumentalities shown.

FIG. 4 is a side perspective view of the first solar panel mounting system of FIG. 3 in an assembled configuration;

FIG. 5 is a side perspective view of a plurality of solar panel mounting systems of FIG. 3 arranged in series as part of an array;

FIG. 6 is a partial side perspective view of a plurality of solar panel mounting systems of FIG. 3 arranged in an array;

FIG. 7 is an exploded partial side perspective view of the array of FIG. 6;

FIG. 13 is a side elevational view of the frame of FIG. 11 and the bracket of FIG. 9 during installation;

FIG. 14 is a partial enlarged side elevational view of the frame of FIG. 11 and the bracket of FIG. 9 in an installed position;

FIG. 15 is a back side perspective view of a mounting rail for use in the solar panel mounting system of FIG. 8;

FIG. 16 is a side elevational view of the mounting rail of FIG. 15;

FIG. 18 is a side elevational view of an alternative configuration of the frame of FIG. 11.

DETAILED DESCRIPTION OF THE INVENTION

Figure 2:
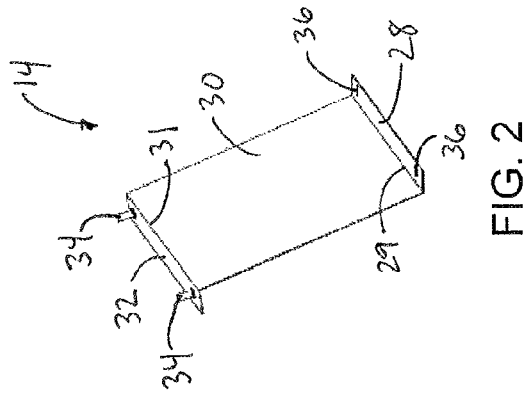
FIG. 2 is a side perspective view of a second support for use in a first solar panel mounting system in accordance with the first preferred embodiment of the present invention.
Figure 3:
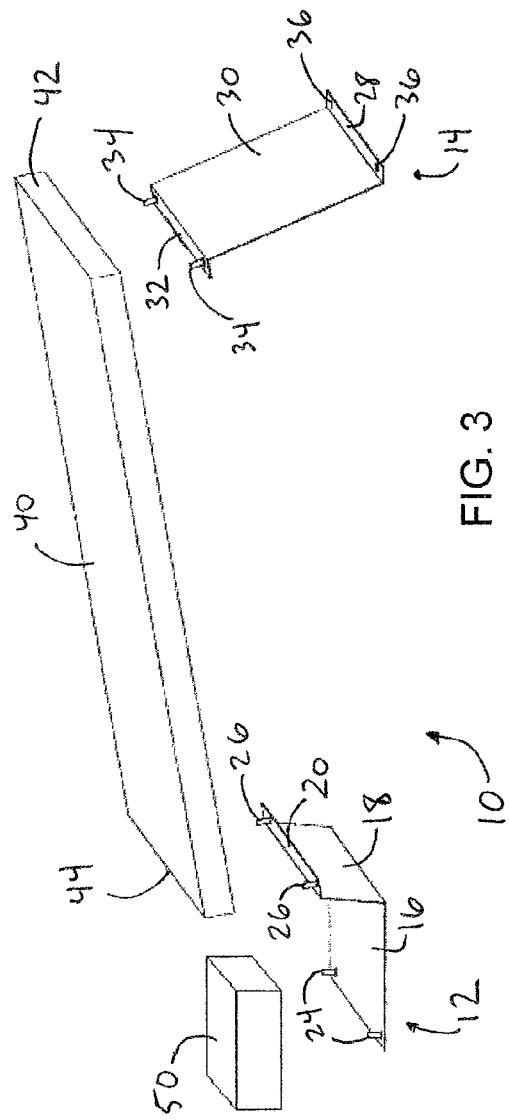
FIG. 3 is an exploded side perspective view of a first solar panel mounting system in accordance with the first preferred embodiment of the present invention.

Certain terminology is used in the following description for convenience only and is not limiting. The words "right", "left", "lower", and "upper" designate directions in the drawings to which reference is made. The words "inwardly" and "outwardly" refer to directions toward and away from, respectively, the geometric center of the device and designated parts thereof. The terminology includes the above-listed words, derivatives thereof, and words of similar import. Additionally, the words "a" and "an", as used in the claims and in the corresponding portions of the specification, mean "at least one."

Referring to the drawings in detail, there is shown in FIGS. 1-7 a first preferred embodiment of a solar panel mounting system, generally designated 10. The mounting system 10 includes at least one first support 12 (FIG. 1) and at least one second support 14 (FIG. 2). The first support 12 preferably has a horizontal support section 16, an inclined side wall 18, and a mounting ledge 20. The horizontal support section 16 and the inclined side wall 18 are preferably continuously formed and meet at a bend joint 17. The side wall 18 is preferably inclined with respect to the horizontal support section 16 at an angle between ninety and ninety-five degrees (90-95°). The mounting ledge 20 and the side wall 18 are also preferably continuously formed and meet at a bend joint 19. The mounting ledge 20 is preferably inclined with respect to the horizontal support section 16 at an angle between five and twenty-five degrees (5-25°). The incline of the mounting ledge 20 is generally selected for providing a desired incline for a solar panel 40 mounted thereto. The incline of the side wall 18 is generally selected for efficient packing and shipping.

The second support 14 also preferably has a horizontal support section 28, an inclined side wall 30, and a mounting ledge 32. The horizontal support section 28 and the inclined side wall 30 are preferably continuously formed and meet at a bend joint 29. The side wall 30 is preferably inclined with respect to the horizontal support section 28 at an angle between forty-five and sixty-five degrees (45-65°). The mounting ledge 32 and the side wall 30 are also preferably continuously formed and meet at a bend joint 31. The mounting ledge 32 is preferably inclined with respect to the horizontal support section 28 at an angle between negative five and negative twenty-five degrees ((−5)-(−25)°). The incline of the mounting ledge 32 is generally selected for providing a desired incline for the solar panel 40. The incline of the side wall 30 is generally selected for efficient deflection of wind.

Figure 1:
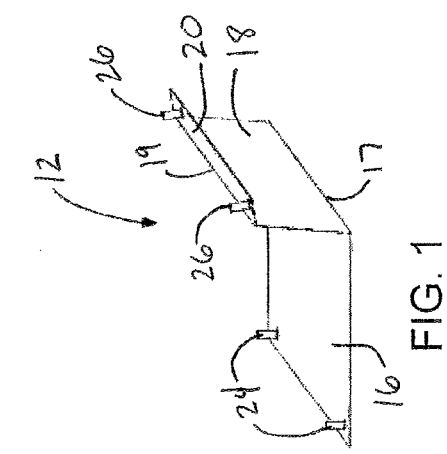
FIG. 1 is a side perspective view of a first support for use in a first solar panel mounting system in accordance with a first preferred embodiment of the present invention.
Figure 8:
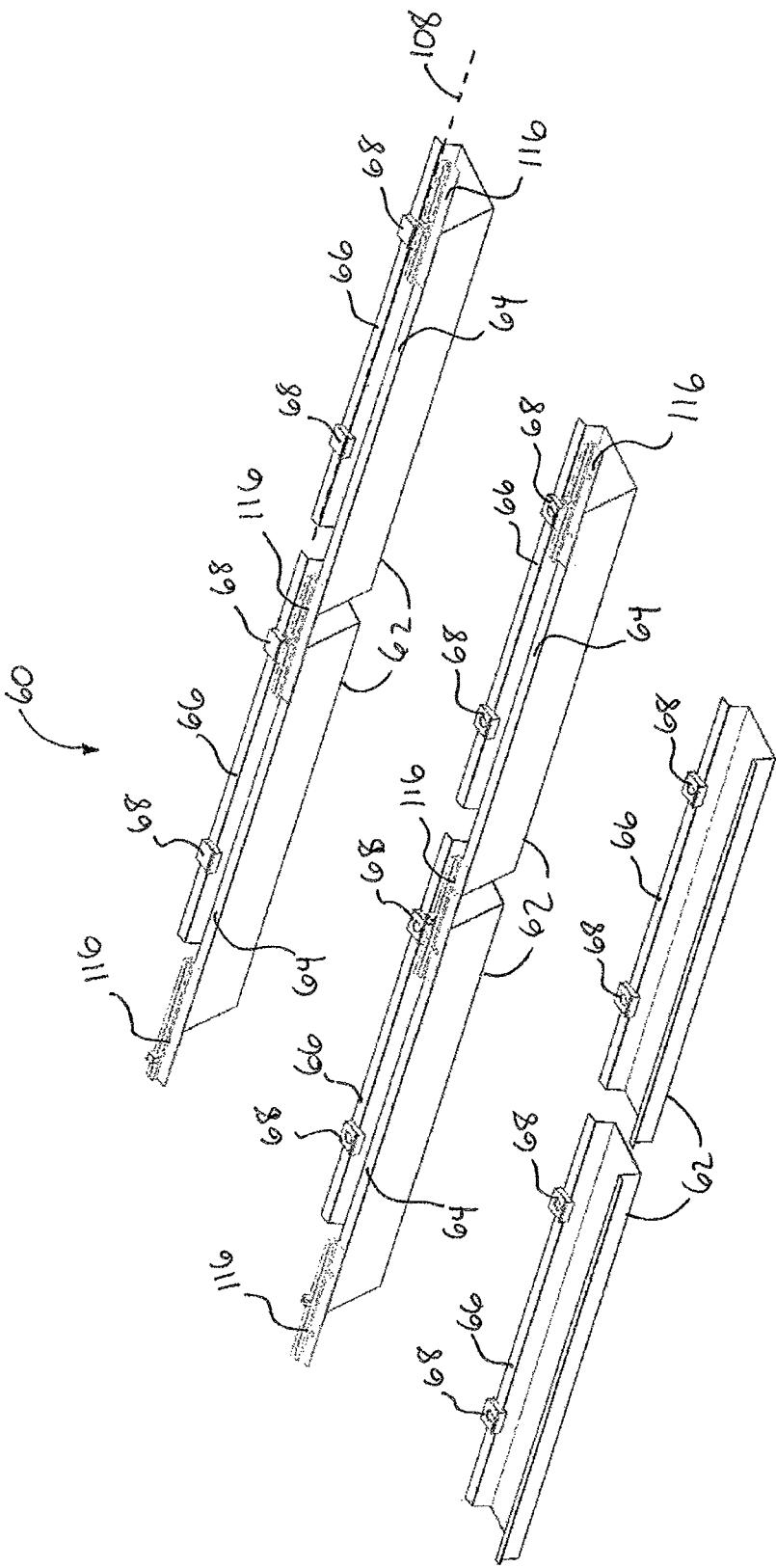
FIG. 8 is a back side perspective view of a second solar panel mounting system in accordance with a second embodiment of the present invention.

The first and second supports 12, 14 are each preferably formed from a single sheet of metal that is selectively bent into the respective forms shown in FIGS. 1 and 2. The metal is preferably aluminum, although other weather-resistant metals such as stainless steel, galvanized sheet metal, or the like may be used. The bend joints 17, 19, 29, 31 can be accomplished by a stamping die or an extrusion die. However, it is preferred that the various bends simply be created by subjecting the sheets to a bending brake. In that manner, the first and second supports 12, 14 can be created with little or no tooling costs. Furthermore, the various bend joints 17, 19, 29, 31 can be selectively altered to meet the needs of a specific installation location or a specific solar panel 40.

The first support 12 also includes a pair of laterally spaced-apart studs 24 disposed on the horizontal support section 16 and another pair of laterally spaced-apart studs 26 disposed on the mounting ledge 20. It is preferred that the studs 24, 26 are self-clinching studs pressed into holes (not shown) on the mounting ledge 20 in such a way that a strong, cold-formed metal joint is created.

The second support 14 also includes a pair of laterally spaced-apart studs 34 disposed on the mounting ledge 32. The studs 34 may be attached to the mounting ledge 32 in the same fashion as described above with respect to the studs 24, 26 of the first support 12. A pair of laterally spaced-apart openings 36 are located in the horizontal support section 28 of the second support 14. The openings 36 are preferably punched out of the metal sheet used to form the second support 14, but could be drilled out or formed in any other suitable manner.

A solar panel 40 is provided for attachment to the mounting system 10. Solar panels 40 are made in different sizes by different manufacturers. There are also different types of solar panels 40 that are used for different purposes, such as generating electricity or heating water. In the first embodiment, a rectangular photovoltaic panel 40 is illustrated. Rectangular photovoltaic panels are widely commercially available. The solar panel 40 is preferably mounted inclined at an angle. Depending upon the location, most solar panels 40 face due south and are inclined between ten degrees and thirty-five degrees. It will therefore be understood that each mounted solar panel 40 has an upper end 42 and a lower end 44, wherein the upper end 42 is elevated above the lower end 44 to produce the desired angle of inclination. The first and second supports 12, 14 are preferably designed to provide the desired angle of inclination. For example, the inclined side wall of the second support 14 preferably extends to a greater height than the inclined side wall 18 of the first support 12.

The lower end 44 of the solar panel 40 can be selectively attached to the mounting ledge 20 of the first support 12 by inserting the studs 26 thereof into corresponding apertures (not shown) in a bottom surface of the solar panel 40. If desired, the apertures may be sized to provide a tight fit or may include gripping tangs which engage and hold the studs 26 in the apertures to secure the solar panel 40 to the first support 12. Other methods such as an adhesive, clips, or other hardware may alternatively be used to secure the solar panel 40 to the first support 12. Similarly, the upper end 42 of the solar panel 40 can be selectively attached to the mounting ledge 32 of the second support 14 by inserting the studs 34 thereof into corresponding apertures (not shown) in the bottom surface of the solar panel 40.

Neither of the first and second supports 12, 14 are directly fastened to the roof or other mounting surface. Rather, the horizontal support section 16 of the first support 12 is preferably sized and shaped to receive one or more ballast weights 50. In the first preferred embodiment shown in FIG. 3, the ballast weight 50 is a conventional brick or concrete block, which are weather resistant, heavy, and very low cost. Alternatively, the ballast weights 50 can be sand bags, water bladders, metal weights, or the like. The ballast weights 50 are added in the amount sufficient to meet wind resistance requirements. Heavy solar arrays may require less ballast weights 50 than light arrays. Although the ballast weight 50 is shown as being selectively placed on the first support 12, ballast weights may alternatively and/or additionally be placed on an appropriately shaped second support 14. If desired, the first and/or second support 12, 14 may have additional side walls (not shown) or other configurations for retaining the ballast weight 50.

Referring to FIG. 5, a plurality of first supports 12, solar panels 40, and second supports 14 are arranged in series. In particular, each opening 36 in the horizontal support section 28 of one of the second supports 14 receives at least a portion of one of the studs 24 in the horizontal support section 16 of an adjoining first support 12. In this manner, solar panels 40 may quickly and easily be joined in series to one another without the need for tools or additional component parts. In addition, one or more ballast weights 50 (FIG. 3) can be retained between two adjacent solar panels 40 by the respective inclined side walls 18, 30 of the joined first and second supports 12, 14.

Referring to FIGS. 6 and 7, a portion of an array 52 of solar panels 40 is shown. It is preferred that each pair of first and second supports 12, 14 be configured to receive only a single solar panel 40. Accordingly, adjoining first or second supports 12, 14 may be connected using one or more straps or brackets 48 to provide structural support and rigidity to the array 52. For example, a bracket 48 may be used engage two adjacent studs 24 of the horizontal support section 16 of two adjacent first supports 12. Each bracket 48 therefore preferably includes two spaced-apart openings 49 (see FIG. 7), each of which corresponds with and receives and preferably retains at least a portion of one of the studs 24 of the horizontal support section 16 of the two adjacent first supports 12. Where the solar panels 40 are connected in a series, the bracket 48 is preferably mounted after the openings 36 of the second supports 14 are placed on the studs 24 of the respective first supports 12. Although the bracket 48 is preferred, other methods may also be used for joining solar panels 40 of the array 52 in keeping with the scope of the invention, and other devices may be employed to retain the brackets 48 on the studs 24.

From the above, it will now he understood that to install the solar panel array 52, solar panels 40 and first and second supports 12, 14 are brought to the roof or other mounting surface. The first and second supports 12, 14 require no preassembly. Rather, solar panels 40 can be attached to the first and second supports 12, 14 with no preassembly preparation. The first and second supports 12, 14 can be custom bent to achieve any desired angle of inclination for the solar panels 40. In this manner, the first and second supports 12, 14 can be made to compensate for rooftops or other mounting surfaces that are slightly pitched for water drainage purposes. The solar panels 40 and first and second supports 12, 14 are then arranged into the array 52 on the roof or other mounting surface. Once properly secured using brackets 48 and oriented, the ballast weights 50 are placed.

The first and second supports 12, 14 require no preassembly to each other and are secured through the use of the brackets 48. Furthermore, the weighting of the first and second supports 12, 14 requires only the placement of the ballast weights 50. However, in a preferred embodiment, the first and second supports 12, 14 are pre-assembled to the solar panels 40 in a factory or shop environment. It will therefore be understood that a solar array 52 can be assembled on a roof or other mounting surface in a highly time and labor efficient manner.

Referring now to FIGS. 8-18, there is shown a second preferred embodiment of a solar panel mounting system, generally designated 60, which includes a plurality of mounting supports 62, each having an upper mounting ledge 64 and a lower mounting ledge 66. The mounting supports 62 are generally described in U.S. Pat. No. 7,921,843, the entire contents of which are incorporated by reference herein. However, the system shown in FIGS. 8-18 may be used with other types and configurations of mounting supports while keeping within the scope of the present invention.

Figure 9:
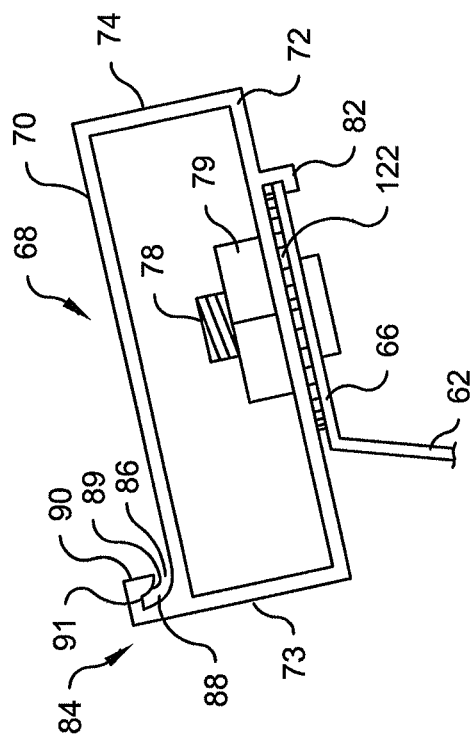
FIG. 9 is a side elevational view of a bracket for use in the solar panel mounting system of FIG. 8.
Figure 10:
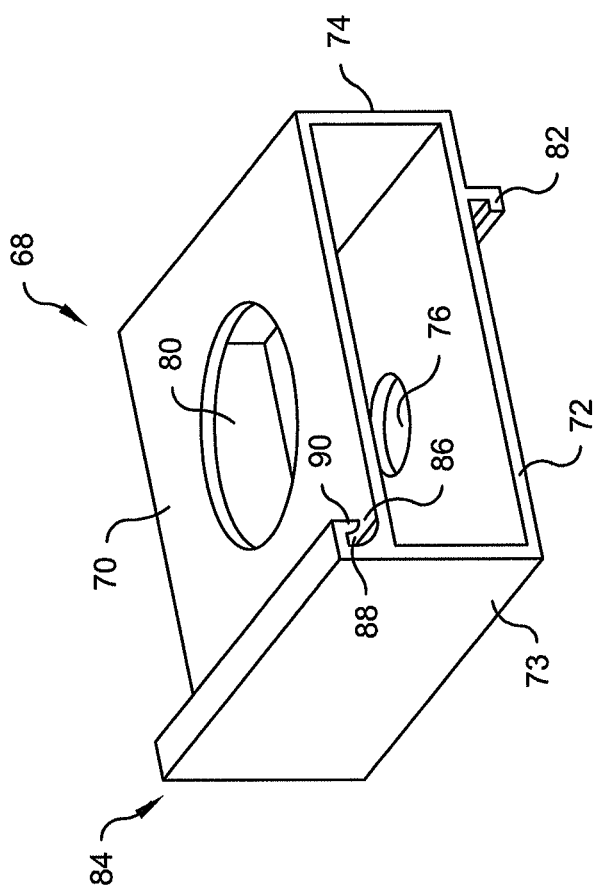
FIG. 10 is a front side perspective view of the bracket of FIG. 9.

The mounting system 60 includes at least two brackets 68 coupled to the lower mounting ledge 66 of the mounting support 62. The brackets 68 are preferably made of aluminum. As shown in FIGS. 9 and 10, the bracket 68 includes an upper platform 70 and a lower platform 72 spaced apart by at least first and second side walls 73, 74. The lower platform 72 may include a first opening 76 formed in a central portion thereof. The first opening 76 is configured to receive a self-clinching threaded stud 78 or other mechanical fastener for attaching the bracket 68 to the lower mounting ledge 66. A nut 79 may be used to secure the threaded stud 78 in a mounted configuration. A second opening 80 may be formed in a central portion of the upper platform 70 to allow for entry of a socket tool or other apparatus for tightening or loosening the threaded stud 78. The second opening 80 therefore preferably has a larger diameter than the first opening 76. Although this is the preferred method of coupling the bracket 68 to the lower platform, other techniques such as the use of a self-drilling screw inserted from below, welding, adhesive, or the like may also be used. If the above mentioned alternative techniques are employed, the first and second openings 76, 80 are not required.

The lower platform 72 preferably includes an L-shaped catch 82 at an underside thereof, which assists in accurate positioning of the bracket 68 on the lower mounting ledge 66. Preferably, the L-shaped catch 82 mates with a lip of the lower mounting ledge 66.

The bracket 68 also includes an outer hinge portion 84 that is preferably integrally formed with the upper platform 70 and or the first side wall 73. The outer hinge portion 84 preferably includes an opening 86 that accesses a curved inner channel 88 and is formed proximate a catch 90. The opening 86, inner channel 88, and catch 90 are preferably formed to extend along an entire width of the bracket 86, although these features may be shorter or longer as desired. The catch 90 preferably includes a sharp inner corner 91 proximate an end of the inner channel 88, and a sloped section 89 extending from the sharp inner corner 91.

Figure 12:
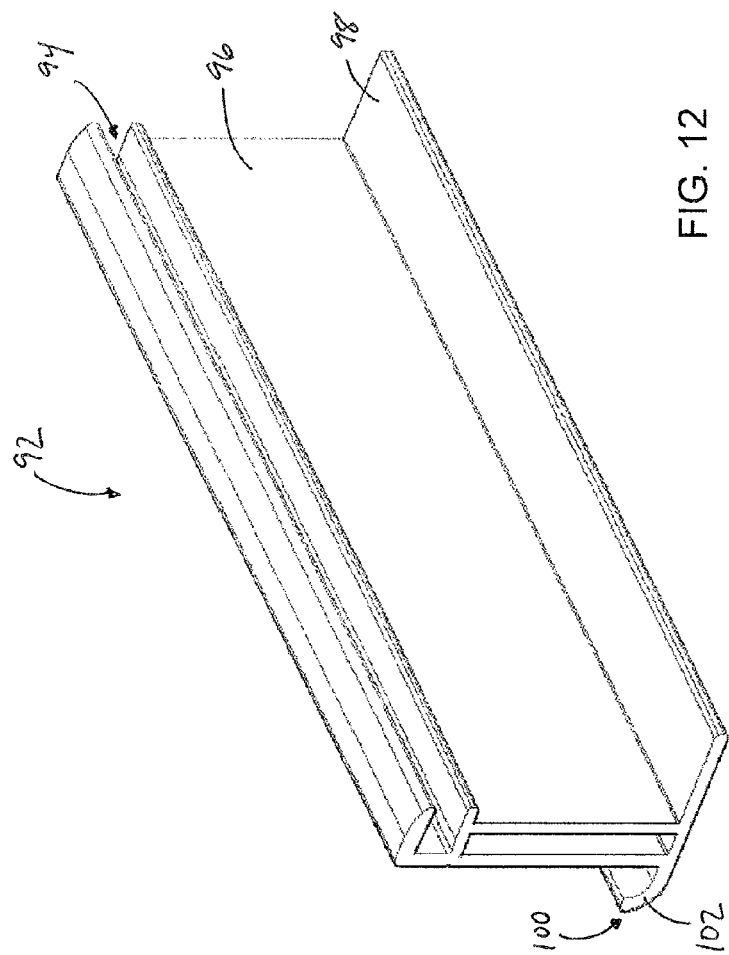
FIG. 12 is a back side perspective view of the frame of FIG. 11.
Figure 11:
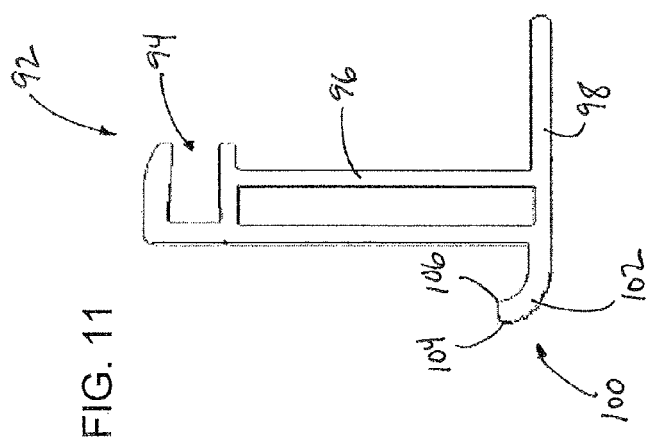
FIG. 11 is a side elevational view of a frame for use in the solar panel mounting system of FIG. 8.

The outer hinge portion 84 is configured to receive an inner hinge portion 100 of a frame 92 coupled to a solar panel 110. The frame 92 is preferably made of aluminum. Referring to FIGS. 11 and 12, the frame 92 includes a panel gripping portion 94 at one end of a body portion 96 and a flange portion 98 at an opposing end of the body portion 96. The inner hinge portion 100 extends from the flange portion 98 and preferably includes a curved hook 102 having a rounded corner 104 and a sharp corner 106. In an installed position (e.g., FIG. 14), the curved hook 102 of the inner hinge portion 100 is received in the inner channel 88 of the outer hinge portion 84. The sharp inner corner 91 of the outer hinge portion 84 mates with the sharp corner 106 of the inner hinge portion 100 to hold the frame 92 securely. The sloped section 89 of the outer hinge portion 84 and the rounded corner 104 of the inner hinge portion 100 allow for easier insertion of the inner hinge portion 100 into the outer hinge portion 84 and rotation of the frame 92 with respect to the bracket 68 toward the seated position generally about a hinge axis 108 (see e.g., FIG. 8). The fit between the inner hinge portion 100 and the outer hinge portion 84 is made so that in the installed position, there is still a small amount of space left between the mating parts of the inner hinge portion 100 and the outer hinge portion 84. This allows the solar panel 110, after the hinge portions 84, 100 are fully seated, to be moved in the axial direction of the assembled hinge. In this way it is possible to easily make fine adjustments to the solar panel 110 so that it is in a precise position for final fastening.

Referring to FIG. 13, the frame 92 is also configured to receive a first end 112 of the solar panel 110 within the panel gripping portion 94. The panel gripping portion 94 preferably has a U-shaped configuration within which at least a portion of the first end 112 of the solar panel 110 is force-fit or press-fit. However, additional hardware (not shown), such as adhesives, gaskets, mechanical fasteners, or the like, may be used to further secure the solar panel 110 to the panel gripping portion 94. The solar panel 110 therefore rotates with the frame 92 with respect to the bracket 68 toward the installed position.

An alternative configuration of the frame 92' is shown in FIG. 18. In the alternative frame 92', the curved hook 102' of the inner hinge portion 100' is slightly recessed beneath the body portion 96'. This may be accomplished, for example, by joining two vertical side walls 97a' of the body portion 96' by an angular side wall 97b', instead of directly joining both vertical side walls 97a' to the flange portion 98'. This alternative configuration of the frame 92' reduces shipping size and helps protect the inner hinge portion 100' during shipping and handling.

Referring to FIGS. 15 and 16, a mounting rail 116 is shown attached to and joining a pair of upper mounting ledges 64 of adjacent mounting supports 62. The mounting rail 116 is preferably made of aluminum. The mounting rail 116 is preferably coupled to each of the upper mounting ledges 64 via a self-clinching threaded stud 118, which is provided through an opening 119 in a lower flange 117 of the mounting rail 116 and a corresponding opening (not shown) of the upper mounting ledge 64, and secured with a nut 120. An external-tooth washer 122 is preferably placed around the threaded stud 118 between the upper mounting ledge 64 and the lower flange 117 of the mounting rail 116 to provide electrical ground bonding of the mounting rail 116 to the mounting support 62. A similar washer 122 may also be used with the threaded stud 78 that connects the bracket 68 to the lower mounting ledge 66 (see FIG. 9). Although the mounting rail 116 is shown in the drawings as bridging two adjacent mounting supports 62, it is also contemplated that the mounting rail 116 could be coupled to a single mounting support 62.

The upper mounting rail 116 also includes a generally rectangular channel 124 formed by a generally U-shaped shell 125 that preferably extends along a length of the upper mounting rail 116. The channel 124 is accessible through a channel opening 126 formed diametrically opposite the upper mounting ledge 64. The channel opening 126 preferably extends along a length of the U-shaped shell 125. A pair of parallel spaced apart rims 127 are preferably disposed along the channel opening 126 and extend at least partially into the channel 124 toward a center thereof.

A square-head or hex-head machine screw 128 may be inserted into the channel 124 of the upper mounting rail 116 at a side of the shell 125. The machine screw 128 may be translated along the channel 124, but the rims 127 cause the channel opening 126 to be smaller than a diameter of the head (not shown) of the machine screw 128, and the machine screw 128 therefore cannot be fully withdrawn from the channel 124 through the channel opening 126, and the sides of the shell 125 will preferably prevent the head of the machine screw 128 from turning. A preferably U-shaped fastening clip 130 may also be provided having a platform section 132 and two clamping sections extending downwardly therefrom. An opening (not shown) in the platform section 132 of the fastening clip 130 is configured to receive a portion of the machine screw 128, which is secured to the fastening clip 130 with a nut 136.

Each solar panel 110 includes first and second sides 113, 115 extending between the first and second ends 112, 114 thereof. Additional frames 92 may be mounted to at least one of the first and second sides 113, 115 (solar panels 110 not shown in FIGS. 15, 16). When the frame 92 disposed at the first end 112 of a solar panel 110 is installed into its corresponding brackets 68 on the lower mounting ledge 66, the second end 114 of the solar panel 110 comes to rest on one or both of the rims 127 of the mounting rail 116. With another frame 92 disposed on the first or second side 113, 115 of the solar panel 110, the fastening clip 130 may be used to secure the inner hinge portion 100 of the additional frame 92 to the rims 127 of the mounting rail 116 by aligning one of the clamping sections 134 of the fastening clip 130 over the inner hinge portion 100 and tightening the nut 136 on the machine screw 128. The fastening clip 130 may translate with the machine screw 128 along the channel 124 in order to properly align the fastening clip 130 with adjacent frames 92 of the solar panels 110.

The arrangement of the fastening clip 130 and the frames 92 provides several distinct advantages. First, a positive mechanical lock is provided that can resist forces, such as thermal expansion and contraction across multiple solar panels 110 in a row, that could pull apart fastening clips 130 that rely only on friction. Second, solar panels 110 may be connected together even if they are in slightly different planes (for instance, when the terrain upon which multiple solar panel mounting supports 62 are placed is uneven or curved), while still providing the positive mechanical lock for a secure hold. Finally slight adjustments can be made to the angle between adjacent solar panels 110 in the plane of those solar panels 110, and thus allows adjustment to the line of solar panels 110 in a row so that installers can keep installing the row in the desired direction, while still providing the positive mechanical lock for a secure hold.

Figure 17:
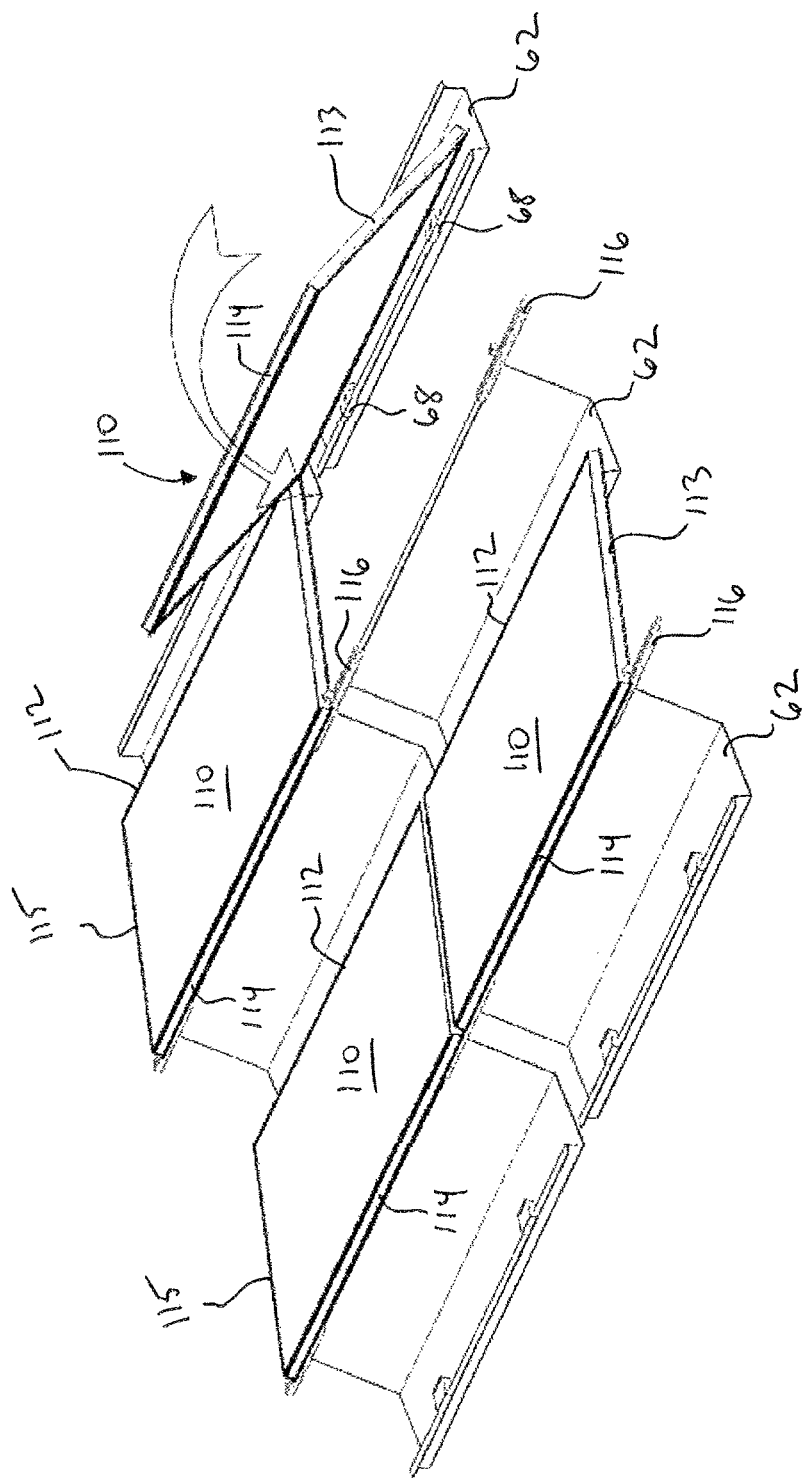
FIG. 17 is a back side perspective view of the solar panel mounting system of FIG. 8 with solar panels installed.

Referring to FIG. 17, the mounting system 60 is shown as part of an array of four solar panels 110. To install a solar panel 110 to the system, initially the first end 112 of the solar panel 110, with a frame 92 attached thereto, would be set down on the upper platform 70 of one or more brackets 68 on the lower mounting ledge 66 of the mounting support 62, and allowed to slide downward to allow the inner hinge portion 100 of the frame 92 to be inserted into the outer hinge portion 84 of the one or more brackets 68. Subsequently, the solar panel 110 and frame 92 are rotated downward with respect to the bracket 68 until the inner hinge portion 100 is received in the outer hinge portion 84 of the bracket 68 in the installed position and the second end 114 of the solar panel comes to rest on one or more mounting rails 116 on the upper mounting ledge 64 of a second mounting support 62. Preferably, the connection between the outer and inner hinge portions 84, 100 is loose so that the frame 92 and solar panel 110 may be translated along the hinge axis 108 with respect to the bracket 68 to allow for alignment with the fastening clips 130 of the one or more mounting rails 116. Once the additional frames 92 on the first and second sides 113, 115 are aligned, the fastening clips 130 are tightened and the solar panel 110 is installed. The foregoing procedure can be accomplished in a very small amount of time and with comparative ease, so that the building of a solar panel array can proceed much more rapidly than is possible using conventional methods and systems.

From the foregoing, it can be seen that embodiments of the present invention comprise solar panel mounting systems. It will be appreciated by those skilled in the art that changes could be made to the embodiments described above without departing from the broad inventive concepts thereof. It is understood, therefore, that the invention is not limited to the particular embodiments disclosed, but it is intended to cover modifications within the spirit and scope of the present invention.

We claim:

1. A solar panel mounting system for use with a solar panel, the mounting system comprising:
   first and second mounting supports, at least one of the first and second mounting supports having a lower mounting ledge, and at least the other of the first and second mounting supports having an upper mounting ledge;
   at least two brackets coupled to the lower mounting ledge, each of the brackets including a first platform coupled to the lower mounting ledge and a second platform spaced apart from the first platform, each bracket further including a first hinge portion formed proximate the second platform, the first hinge portion including a curved channel and a first catch; and
   a first frame having at a first end thereof a panel gripping portion configured to grip the solar panel at an edge thereof oriented generally parallel with respect to the lower mounting ledge, and having at an opposing second end a second hinge portion comprising a flange and a curved hook extending from the flange, the first hinge portion of each of the at least two brackets being configured to rotatably receive the second hinge portion, wherein the curved hook is received in the curved channel and retained by the first catch and the flange is supported on the second platform of the at least two brackets.

2. The solar panel mounting system of claim 1, further comprising:
   a mounting rail coupled to the upper mounting ledge; and
   a second frame having at a first end thereof a panel gripping portion configured to grip the solar panel at an edge thereof oriented generally perpendicular with respect to the upper mounting ledge, and having at an opposing second end a flange, at least a portion of the flange being supported by the mounting rail when the solar panel is in an installed position.

3. The solar panel mounting system of claim 2, further comprising a fastening clip secured to the mounting rail and configured to compress the flange of the second frame against the mounting rail when the solar panel is in the installed position.

4. The solar panel mounting system of claim 3, wherein the mounting rail comprises a longitudinal channel accessible by a channel opening formed by two parallel spaced apart rims extending in a direction parallel to the upper mounting ledge, and the fastening clip is secured to the mounting rail by a fastener slidably positioned in the channel and extending through the channel opening.

5. The solar panel mounting system of claim 4, wherein the spaced apart rims form a support surface of the mounting rail, the flange of the second frame being in contact with the support surface of the mounting rail when the solar panel is in the installed position.

6. The solar panel mounting system of claim 2, wherein the mounting rail is further coupled to an adjacent upper mounting ledge of a third mounting support.

7. The solar panel mounting system of claim 1, wherein the first platform of each of the at least two brackets includes a first opening configured to receive a fastener to fix the bracket to the lower mounting ledge.

8. The solar panel mounting system of claim 7, wherein the second platform of each of the at least two brackets includes a second opening axially aligned with the first opening, the second opening being larger than the first opening.

9. The solar panel mounting system of claim 1, wherein the first platform of each of the at least two brackets includes a second catch protruding therefrom and configured to mate with an outer lip of the lower mounting ledge.

10. The solar panel mounting system of claim 1, wherein the other of the first and second mounting supports also has a lower mounting ledge.

* * * * *